(12) United States Patent
Grisenthwaite

(10) Patent No.: US 8,301,856 B2
(45) Date of Patent: Oct. 30, 2012

(54) RESTRICTING MEMORY AREAS FOR AN INSTRUCTION READ IN DEPENDENCE UPON A HARDWARE MODE AND A SECURITY FLAG

(75) Inventor: Richard Roy Grisenthwaite, Nr Royston (GB)

(73) Assignee: ARM Limited, Cambridge (GB)

( * ) Notice: Subject to any disclaimer, the term of this patent is extended or adjusted under 35 U.S.C. 154(b) by 297 days.

(21) Appl. No.: 12/656,786

(22) Filed: Feb. 16, 2010

(65) Prior Publication Data

US 2011/0202739 A1    Aug. 18, 2011

(51) Int. Cl.
*G06F 12/14* (2006.01)
(52) U.S. Cl. ............................... 711/163; 711/173
(58) Field of Classification Search .................. None
See application file for complete search history.

(56) References Cited

U.S. PATENT DOCUMENTS

| 5,522,075 | A | 5/1996 | Robinson et al. | |
|---|---|---|---|---|
| 2002/0082824 | A1 | 6/2002 | Neiger et al. | |
| 2004/0243783 | A1* | 12/2004 | Ding et al. | 711/170 |
| 2006/0112241 | A1* | 5/2006 | Weiss et al. | 711/154 |
| 2007/0250675 | A1* | 10/2007 | Ono et al. | 711/163 |
| 2008/0244206 | A1 | 10/2008 | Heo et al. | |
| 2008/0276051 | A1* | 11/2008 | Renno | 711/154 |

OTHER PUBLICATIONS

International Search Report and Written Opinion of the International Searching Authority dated Mar. 16, 2011 in PCT/GB2010/052105.

* cited by examiner

*Primary Examiner* — Kaushikkumar Patel
(74) *Attorney, Agent, or Firm* — Nixon & Vanderhye P.C.

(57) ABSTRACT

An apparatus for processing data 2 includes a processor 8, a memory 6 and memory control circuitry 12. The processor 8 operates in a plurality of hardware modes including a privileged mode and a user mode. When operating in the privileged mode, the processor 8 is blocked by the memory control circuitry 12 from fetching instructions from memory address regions 34, 38, 42 within the memory 6 which are writeable within the user mode if a security flag within register 46 is set to indicate that this blocking mechanism is active.

13 Claims, 3 Drawing Sheets

RESTRICTING MEMORY AREAS FOR AN INSTRUCTION READ IN DEPENDENCE UPON A HARDWARE MODE AND A SECURITY FLAG

BACKGROUND OF THE INVENTION

1. Field of the Invention

This invention relates to the field of data processing systems. More particularly, this invention relates to data processing systems having a plurality of hardware modes of operation and the control of memory access in dependence upon a current hardware mode.

2. Description of the Prior Art

It is known to provide data processing systems in which the processor has a plurality of hardware modes of operation. For example, the processor may operate in hardware modes including a privileged mode and a user mode. There may also be further hardware modes for other purposes. The privileged mode will normally be used for more trusted program code, such as an operating system kernel, and will have access to more areas of memory than when the processor is operating in the user mode. The user mode will typically be used for less trusted programs, such as application programs. In this way, malicious or accidental access from a program to predetermined areas of memory may be prevented by using a memory management unit or a memory protection unit sensitive to the current mode of operation of the processor and which prevents access to the predetermined areas of memory if the processor is not in the privileged mode. The model within such systems is that the privileged mode of operation has access to more of the system resources, e.g. areas within the memory, than the user mode.

One type of malicious security attack, or unfortunate erroneous operation, which can occur is that the system is inappropriately made to execute program instructions stored within areas of memory that are writeable in the user mode while executing in the privileged mode. In this way, as one example, a person may write malicious program instructions into areas of the memory which are accessible in the user mode and then switch the processor into the privileged mode where access to secure regions of the memory may be made while executing the malicious program instructions read from the memory area accessible in the user mode.

SUMMARY OF THE INVENTION

Viewed from one aspect the present invention provides apparatus for processing data comprising:

a processor responsive to a stream of program instructions to perform processing operations; and memory control circuitry coupled to said processor and to a memory and configured to control access to said memory by said processor; wherein said processor has a plurality of hardware modes of operation including at least a first mode and a second mode;

said memory control circuitry controls access to said memory such that:

(i) when said processor is in said first mode, said memory control circuitry permits write access to a first portion of said memory and does not permit at least write access to a second portion of said memory; and (ii) when said processor is in said second mode, said memory control circuitry permits write access to said first portion of said memory and permits write access to a second portion of said memory; and said memory control circuitry is responsive to a security flag having a set value to prevent said processor reading from said first portion of said memory program instructions for execution by said processor in said second mode.

The present technique recognises that in practice there is little reason for a system to legitimately execute program instructions in the privileged mode when those program instructions are read from a region of the memory which may be written in the user mode. Code to be executed in the privileged mode is normally stored within memory which is only writeable in the privileged mode. This protects the program instructions to be executed in the privileged mode from inappropriate accidental alteration as well as from malicious alteration. Accordingly, the present technique moves against the general technical prejudice in this field of giving the privileged mode more rights of access than the user mode by using the memory control circuitry to prevent the processor reading program instructions for execution in the privileged mode from areas of the memory which may be written in the user mode. This action of the memory control circuitry may be globally switched on and off by the security flag such that the hardware is able to support systems in which the designer does wish to execute in the privileged mode program instructions which are stored within areas of the memory writeable in the user mode while providing a simple way to switch off this capability with a security flag controlling a hardware enforcement mechanism provided by the memory control circuitry. It will be appreciated that in the above, the hardware modes have been referred to as a privileged mode and a user mode, but that the present technique is not restricted to use within systems having such modes and more generally may be used within systems having a first mode and a second mode, where the second mode has access to more regions of the memory than the first mode and yet is selectively prevented from executing program instructions read from regions of the memory which may be written to in the first mode.

The memory control circuitry may be responsive to control data to identify one or more memory address regions within the memory as part of the first portion and one or more memory address regions within the memory as part of the second portion. Thus, the first portion and the second portion need not be contiguous in the memory and may be defined by the control data read by the memory control circuitry. In some embodiments this may be memory page table data as read by a memory management unit.

The present technique is particularly useful in systems in which the first mode is a user mode for executing application programs and the second mode is a privileged mode for executing at least an operating system kernel program.

When the security flag has a set value, the processor operating in the second mode may be permitted by the memory control circuitry to read data values from the first portion of the memory as such data values are not fetched as instructions to be executed but are instead fetched into the data path as data values to be manipulated.

It will be appreciated that the memory control circuitry can take a variety of different forms. Some examples of the memory control circuitry are a memory management unit and a memory protection unit.

The security flag may conveniently be written under program instruction control when the processor is in the second mode and the security flag cannot be written under program instruction control when the processor is in the first mode. In this way, the security provided by the security flag may not be circumvented by changing the value of the security flag when operating in the first mode.

Viewed from another aspect the present invention provides apparatus for processing data comprising:

processor means for performing processing operations in response to a stream of program instructions; and memory control means circuitry coupled to said processor means and to a memory means for storing data for controlling access to said memory means by said processor means; wherein said processor means has a plurality of hardware modes of operation including at least a first mode and a second mode;

said memory control means controls access to said memory means such that:

(i) when said processor means is in said first mode, said memory control means permits write access to a first portion of said memory means and does not permit at least write access to a second portion of said memory means; and (ii) when said processor means is in said second mode, said memory control means permits write access to said first portion of said memory means and permits write access to a second portion of said memory means; and said memory control means is responsive to a security flag having a set value to prevent said processor means reading from said first portion of said memory means program instructions for execution by said processor means in said second mode.

Viewed from a further aspect the present invention provides a method of processing data, said method comprising the steps of:

performing processing operations with a processor in response to a stream of program instructions; and controlling access to a memory by said processor using memory control circuitry coupled to said processor and to said memory; wherein said processor has a plurality of hardware modes of operation including at least a first mode and a second mode;

said memory control circuitry controls access to said memory such that:

(i) when said processor is in said first mode, said memory control circuitry permits write access to a first portion of said memory and does not permit at least write access to a second portion of said memory; and (ii) when said processor is in said second mode, said memory control circuitry permits write access to said first portion of said memory and permits write access to a second portion of said memory; and said memory control circuitry is responsive to a security flag having a set value to prevent said processor reading from said first portion of said memory program instructions for execution by said processor in said second mode.

The invention may also be implemented in the form of a virtual machine having the above features.

The above, and other objects, features and advantages of this invention will be apparent from the following detailed description of illustrative embodiments which is to be read in connection with the accompanying drawings.

DESCRIPTION OF EMBODIMENTS

Figure 1:
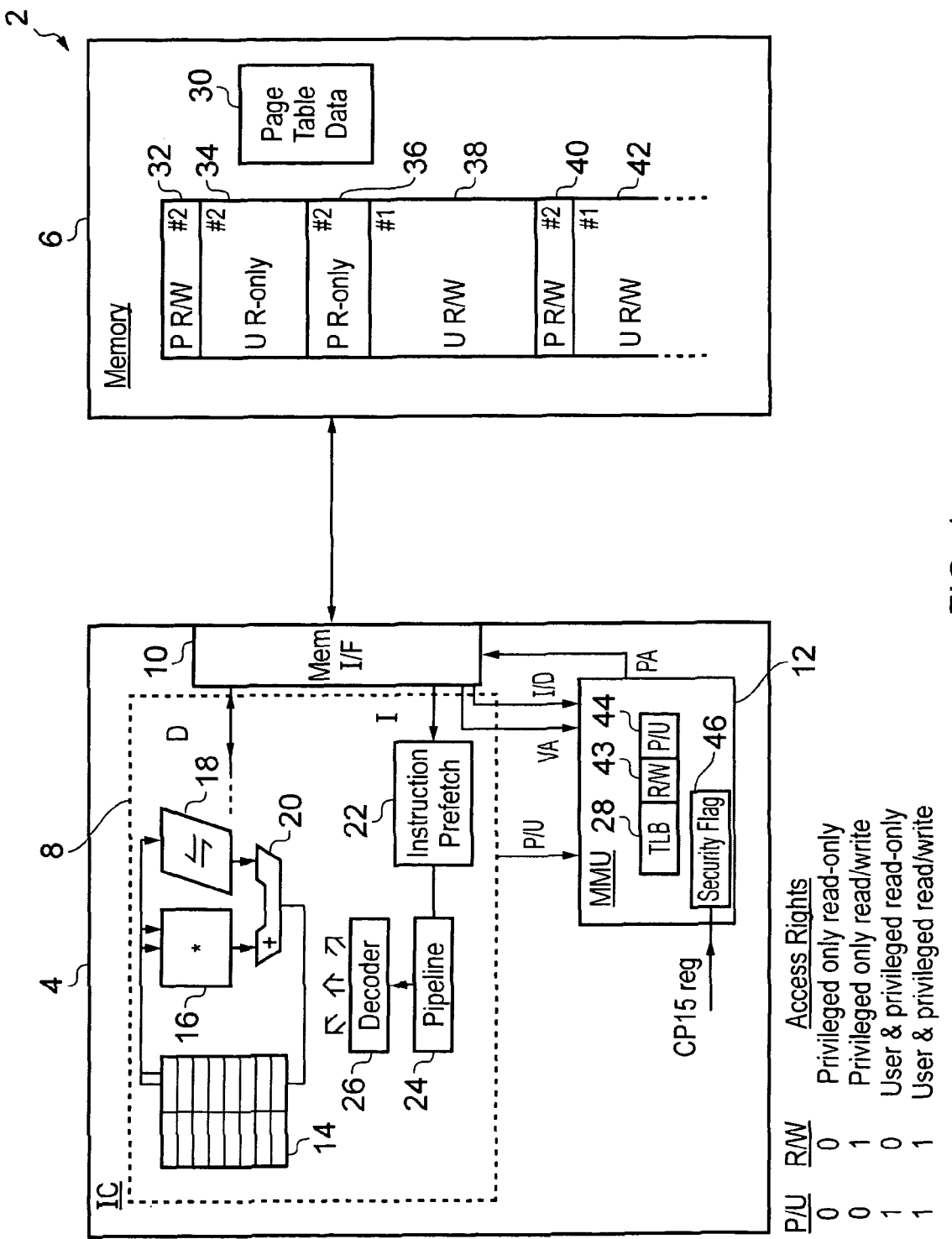
FIG. 1 schematically illustrates a data processing system including a processor and a memory.

FIG. 1 schematically illustrates a data processing system 2 including an integrated circuit 4 coupled to a memory 6. Integrated circuit 4 includes a processor 8, a memory interface circuit 10 and a memory management unit 12. Within the processor 8 there are provided a general purpose register bank 14, a multiplier 16, a shifter 18 and an adder 20 which form a data path for performing processing operations upon data values D fetched from the memory 6 under control of program instructions I. The program instructions I fetched from the memory 6 by an instruction prefetch unit 22 are supplied to an instruction pipeline 24. The instruction pipeline 24 controls an instruction decoder 26 to generate control signals for the data path 14, 16, 18, 20 to configure and control the data path 14, 16, 18, 20 to perform the desired processing operation(s) specified by the program instruction being decoded. It will be appreciated by those in this technical field that the processor 8 will typically contain many more circuit elements, which have been omitted from FIG. 1 for the sake of clarity.

Also included within the integrated circuit 4 are the memory interface circuit 10 and the memory management unit 12. The memory interface circuit 10 is responsible for generating the memory access signals (which may be reads or writes) sent from the integrated circuit 4 to the memory 6. These memory access signals use physical addresses within the memory 6. The processor 8 operates using virtual addresses, although this arrangement is only an example of a system in which the present techniques may be used. The memory management unit 12 translates the virtual addresses to physical addresses using page table data 30. This page table data is control data for the memory management unit 12. The page table data of recently accessed regions of memory is stored within a translation lookaside buffer 28 within the memory management unit 12. If the page table data for a particular memory access is not present within the translation lookaside buffer 28, then the appropriate page table data is fetched from the full store of page table data 30 within the memory 6.

The memory 6 provides a memory address space addressed using the physical addresses generated by the memory interface circuit 10. The memory 6 may not provide storage corresponding to all of the possible memory address space. The memory address space is divided into memory address regions 32, 34, 36, 38, 40, 42 etc. Each of these memory address regions 32 to 42 has associated page table data, which is used by the memory management unit 12 to control access to those memory regions. As will be understood by those in this technical field, this page table data may include data indicating whether or not the memory address region concerned can be accessed (either read-only or read/write) if the processor 8 is operating in the privileged mode or is operating in either the privileged mode or the user mode. This portion of the page table data is indicated by the P/U flag data 44 illustrated as part of the translation lookaside buffer 28. The page table data also includes R/W flag data 43 that indicates whether the access permitted is read-only or read/write. The table shown in FIG. 1 gives one example of different values of the P/U flag data 44 and the R/W flag data 43 mapping to different access rights. The memory address regions 32, 34, 36, 40 together form a second portion of the memory 6, which is not writeable when the processor 8 is in the user mode. Memory address regions 32, 36 and 40 are only accessible in the privileged mode. Memory address region 34 is read-only accessible in the user mode, but may not be written to in the user mode. The memory address regions 38 and 42 form a first portion of the memory 6 which may be written and read when the processor is in the user mode, may be written when the processor 8 is in the privileged mode, may be read for data values when the processor 8 is in the privileged mode, but may not be read for instruction values when the processor 8 is in the privileged mode.

This behaviour is enforced in this example embodiment by the memory management unit 12. The memory management unit 12 receives an input signal P/U from the processor 8 indicating whether the processor 8 is currently in the privileged mode or the user mode. The memory management unit 12 also receives an input signal I/D from the memory interface circuit 10 indicating whether a memory access being performed relates to an instruction fetch or a data access operation. Using these input signals and a value of a security flag stored within a register 46 within the memory management unit 12, the prevention of execution of program instructions in the privileged mode read from the first portion 38 and 42 of the memory 6 may be enforced.

Figure 2:
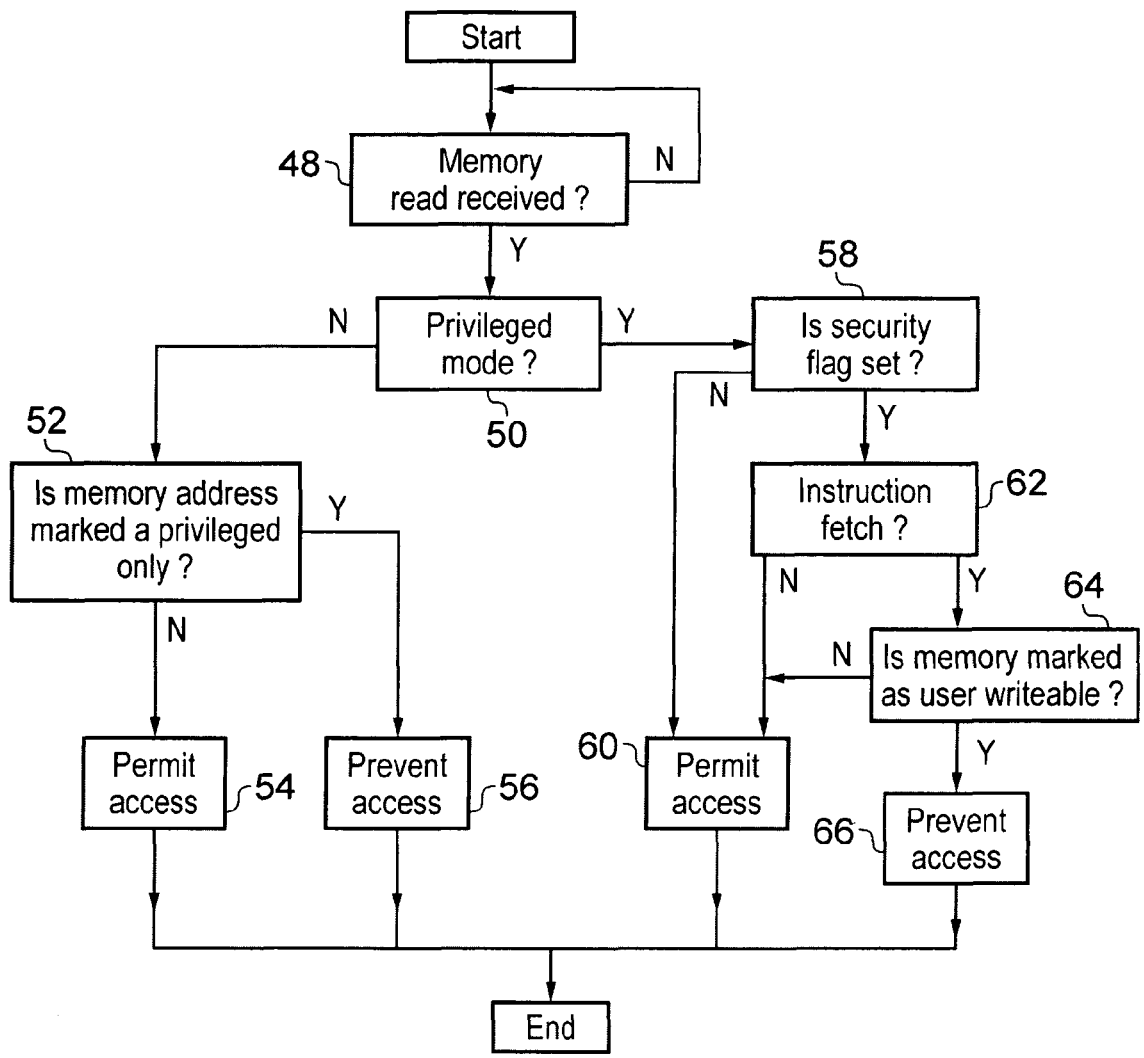
FIG. 2 is a flow diagram schematically illustrating the control of a memory read operation in dependence upon: the hardware mode of the processor; whether the read is an instruction fetch; and whether the read is from a memory location that is accessible in a user mode.

FIG. 2 is a flow diagram schematically illustrating part of the operation of the memory management unit 12. It will be appreciated that the memory management unit 12 could also be provided in the form of a memory protection unit. At step 48 the processing waits until a memory read request operation is received at the memory interface circuit 10 from the processor 8. Step 50 then determines whether the processor 8 is currently in the privileged mode using the P/U input signal to the memory management unit 12. If the processor 8 is not in the privileged mode, then the processor 8 will, in this simple example, be in the user mode and processing proceeds to step 52. Step 52 determines whether or not the memory address to which a read access is being attempted is marked within the page table data 30 as accessible only when in the privileged mode. If the memory address is not marked as privileged-only, then processing proceeds to step 54 at which the read access is permitted. However, if the memory address is marked as a privileged-only address, then step 56 prevents the access.

If the determination at step 50 is that the processor 8 is currently in the privileged mode, then processing proceeds to step 58. Step 58 determines whether or not the security flag stored within register 46 is currently set. If the security flag is set (has a set value), then the enforcement of the policy of not permitting the processor 8 to execute program instructions read from the first portion 38 and 42 of the memory 6 will be enforced. If the determination at step 58 is that the security flag is not set, then processing proceeds to step 60 where the access is permitted.

If the security flag is set, as determined at step 58, then processing proceeds to step 62 where a determination is made as to whether or not the access being performed is an instruction fetch or a data access. This determination may be made using the I/D input signal to the memory management unit 12. If the memory access being performed is a data access, then processing proceeds to step 60 where the access is again permitted. However, if the security flag is set as determined at step 58 and the access operation is an instruction fetch as determined at step 62, then processing proceeds to step 64 where a determination is made as to whether or not the memory address concerned is part of the first portion of the memory 6, i.e. in this example is one of memory regions 38 and 42 as indicated by the page table data (i.e. the P/U flag data 44 and the R/W flag data 43) for the address to which read access is being attempted. If the memory address is not within the first portion, then the instruction fetch operation may be permitted and processing proceeds to steps 60. However, if the instruction fetch operation is being attempted from the first portion of the memory 38 and 42, then processing proceeds to step 66 where the access concerned is prevented.

When a memory access is prevented, such as in either of steps 56 or 66, then a memory abort may be triggered such that memory abort exception handling program code is executed. This type of memory abort processing will be familiar to those in this technical field.

Figure 3:
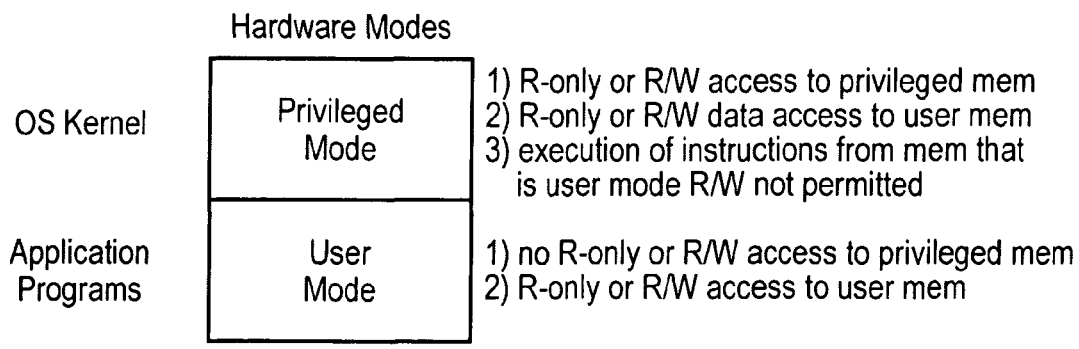
FIG. 3 schematically illustrates multiple hardware modes for operation and their associated access rights and typical uses.

FIG. 3 schematically illustrates multiple hardware modes of the processor 8 (or modes emulating such hardware modes in a virtual machine implementation). In this example only two modes are illustrated, namely a privileged mode and a user mode. It will be appreciated that the present techniques may be used with processors having a larger number of modes. The privileged mode permits either read-only or read/write access to memory address regions marked as privileged. The privileged mode also allows either read-only or read/write access via the data path to memory address regions marked as user mode read/write accessible. Within the privileged mode, if the security flag within register 46 is set, then execution of instructions from user mode read/write accessible memory is not permitted. However, the read-only or read/write access to privileged memory referred to above permits instructions fetched from a privileged memory to be executed when in the privileged mode.

When operating in the user mode, no read-only or read/write access is permitted to memory address regions marked as privileged mode memory address regions. However, read-only or read/write access is permitted to memory address regions marked as user mode memory address regions.

It will be appreciated that different types of programs will typically be executed in the different hardware modes. More trusted programs, such as an operating system kernel program will typically operate within the privileged mode. Application programs will typically operation within the user mode.

The security flag within the register 46 which controls whether or not privileged mode execution of program instructions stored within memory writeable in user mode is permitted is set under program instruction control. The register 46 may be configured as a co-processor register which may be written to set the security flag using a co-processor instruction. In order to preserve the security of the mechanism being provided using the security flag, the security flag may only be written when in the privileged mode. This prevents a malicious, or at least unauthorised, user mode program unsetting the security flag thereby permitting privileged mode execution of program instructions stored within memory writeable in user mode.

Figure 4:
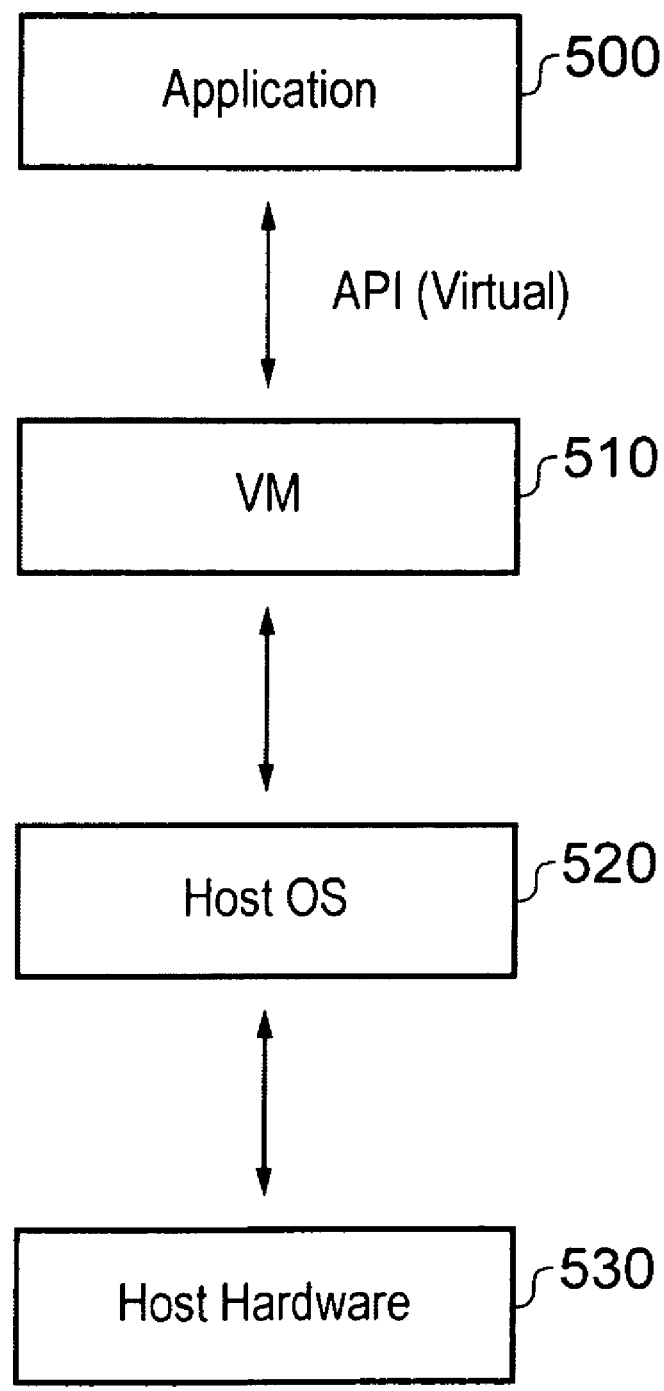
FIG. 4 schematically illustrates a virtual machine implementation.

FIG. 4 illustrates such a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data comprising:
 a processor responsive to a stream of program instructions to perform processing operations; and
 memory control circuitry coupled to said processor and to a memory and configured to control access to said memory by said processor; wherein
 said processor has a plurality of hardware modes of operation including at least a first mode and a second mode;
 said memory control circuitry controls access to said memory such that:
 (i) when said processor is in said first mode, said memory control circuitry permits write access to a first portion of said memory and does not permit at least write access to a second portion of said memory; and
 (ii) when said processor is in said second mode, said memory control circuitry permits write access to said first portion of said memory and permits write access to a second portion of said memory; and
 said memory control circuitry is responsive to a security flag having a set value to give said processor in said first mode an execution access not given to said processor in said second mode by preventing said processor reading, from said first portion of said memory, program instructions for execution by said processor in said second mode, wherein when said security flag has said set value and said processor is in said second mode, said memory control circuitry permits said processor to read data values from said first portion of said memory.

2. Apparatus as claimed in claim 1, wherein said processor reads program instructions for execution from said second portion of said memory.

3. Apparatus as claimed in claim 1, wherein said memory control circuitry is responsive to control data to identify one or more memory address regions within said memory as part of said first portion and one or more memory address regions within said memory as part of said second portion.

4. Apparatus as claimed in claim 1, wherein said first mode is a user mode for executing application programs and said second mode is a privileged mode for executing at least an operating system kernel program.

5. Apparatus as claimed in claim 1, wherein said memory control circuitry comprises one of:
 a memory management unit; and
 a memory protection unit.

6. Apparatus as claimed in claim 1, wherein said security flag is written under program instruction control when said processor is in said second mode and said security flag cannot be written under program instruction control when said processor is in said first mode.

7. Apparatus for processing data comprising:
 processor means for performing processing operations in response to a stream of program instructions; and
 memory control means circuitry coupled to said processor means and to a memory means for storing data for controlling access to said memory means by said processor means; wherein
 said processor means has a plurality of hardware modes of operation including at least a first mode and a second mode;
 said memory control means controls access to said memory means such that:
 (i) when said processor means is in said first mode, said memory control means permits write access to a first portion of said memory means and does not permit at least write access to a second portion of said memory means; and
 (ii) when said processor means is in said second mode, said memory control means permits write access to said first portion of said memory means and permits write access to a second portion of said memory means; and
 said memory control means is responsive to a security flag having a set value to give said processor means in said first mode an execution access not given to said processor means in said second mode by preventing said processor means reading, from said first portion of said memory means, program instructions for execution by said processor means in said second mode, wherein when said security flag has said set value and said processor means is in said second mode, said memory control circuitry permits said processor means to read data values from said first portion of said memory means.

8. A method of processing data, said method comprising the steps of:
 performing processing operations with a processor in response to a stream of program instructions; and
 controlling access to a memory by said processor using memory control circuitry coupled to said processor and to said memory; wherein
 said processor has a plurality of hardware modes of operation including at least a first mode and a second mode;
 said memory control circuitry controls access to said memory such that:
 (i) when said processor is in said first mode, said memory control circuitry permits write access to a first portion of said memory and does not permit at least write access to a second portion of said memory; and
 (ii) when said processor is in said second mode, said memory control circuitry permits write access to said first portion of said memory and permits write access to a second portion of said memory; and
 said memory control circuitry is responsive to a security flag having a set value to give said processor in said first mode an execution access not given to said processor in said second mode by preventing said processor reading, from said first portion of said memory, program instructions for execution by said processor in said second mode, wherein when said security flag has said set value and said processor is in said second mode, said memory control circuitry permits said processor to read data values from said first portion of said memory.

9. A method as claimed in claim 8, wherein said processor reads program instructions for execution from said second portion of said memory.

10. A method as claimed in claim 8, wherein said memory control circuitry is responsive to control data to identify one or more memory address regions within said memory as part of said first portion and one or more memory address regions within said memory as part of said second portion.

11. A method as claimed in claim 8, wherein said first mode is a user mode for executing application programs and said second mode is a privileged mode for executing at least an operating system kernel program.

12. A method as claimed in claim 8, wherein said memory control circuitry comprises one of:
- a memory management unit; and
- a memory protection unit.

13. Apparatus for processing data having processing circuitry controlled by a computer program to provide a virtual machine apparatus for performing a method as claimed in claim 1.

* * * * *